June 4, 1968   J. J. SHUTTLEWORTH   3,386,224
CASE PACKER

Filed Dec. 16, 1965   9 Sheets-Sheet 1

INVENTOR.
JAMES J. SHUTTLEWORTH

BY Lockwood, Woodard, Smith & Wrikart
Attorneys

INVENTOR.
JAMES J. SHUTTLEWORTH

June 4, 1968  J. J. SHUTTLEWORTH  3,386,224
CASE PACKER
Filed Dec. 16, 1965  9 Sheets-Sheet 3
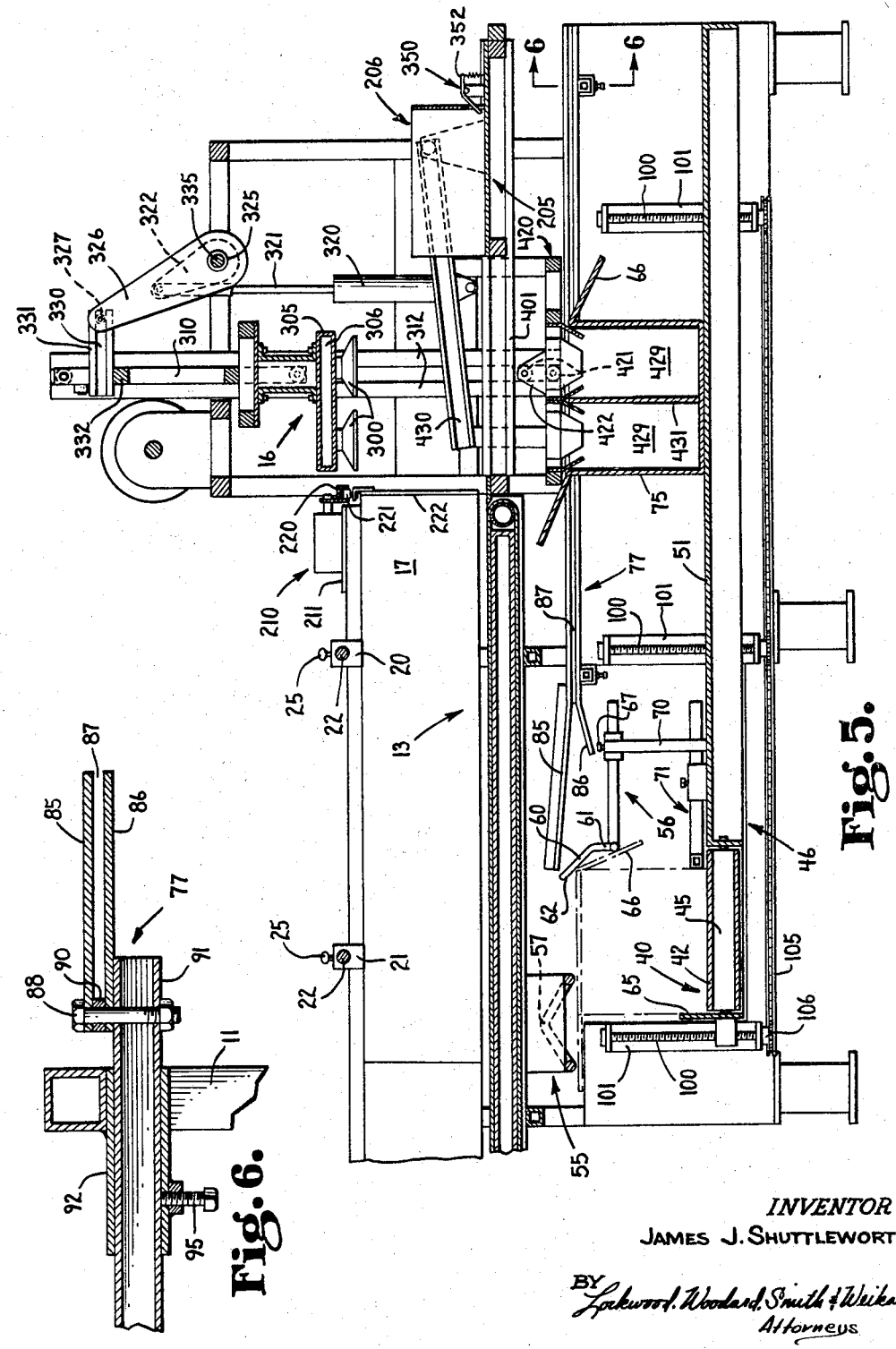
INVENTOR
JAMES J. SHUTTLEWORTH
BY Lakwood, Woodard, Smith & Weikart
Attorneys June 4, 1968   J. J. SHUTTLEWORTH   3,386,224
CASE PACKER
Filed Dec. 16, 1965   9 Sheets-Sheet 4

INVENTOR.
JAMES J. SHUTTLEWORTH
BY Lockwood, Woodard, Smith & Weikart
Attorneys

June 4, 1968 J. J. SHUTTLEWORTH 3,386,224
CASE PACKER
Filed Dec. 16, 1965 9 Sheets-Sheet 5
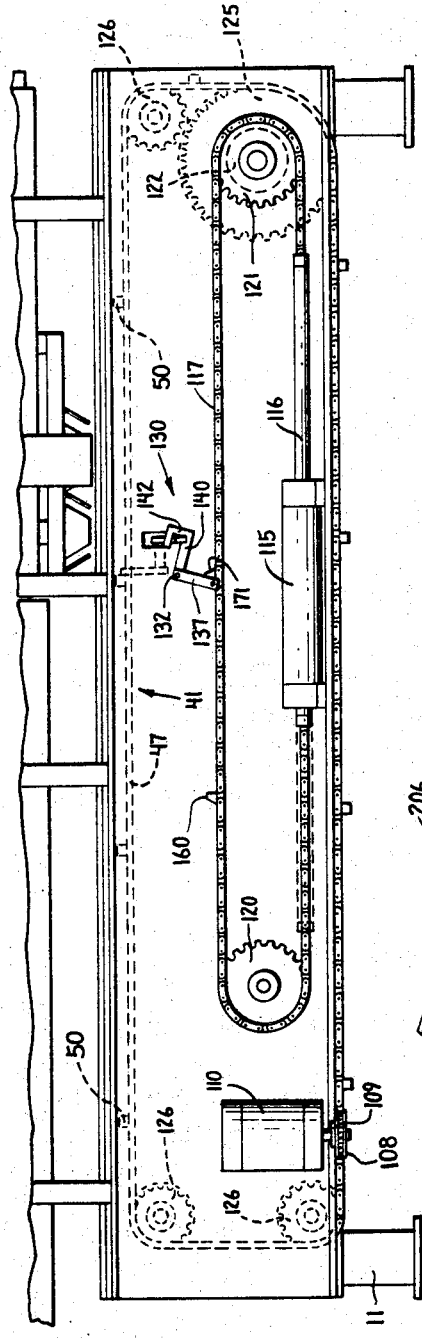
Fig. 12.
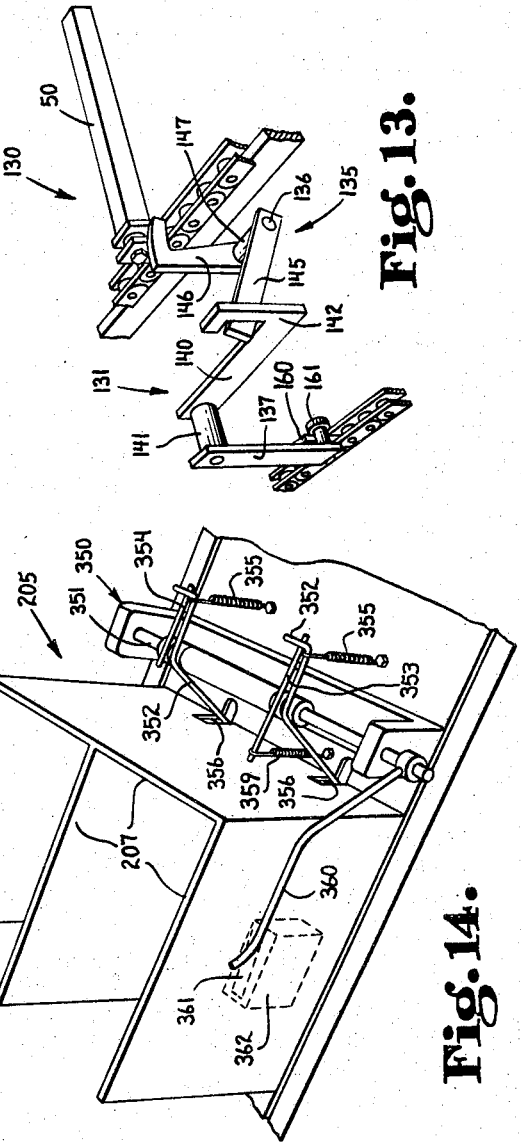
Fig. 13.
Fig. 14.
*INVENTOR*
JAMES J. SHUTTLEWORTH
BY
Lockwood, Woodard, Smith & Weikart
*Attorneys*

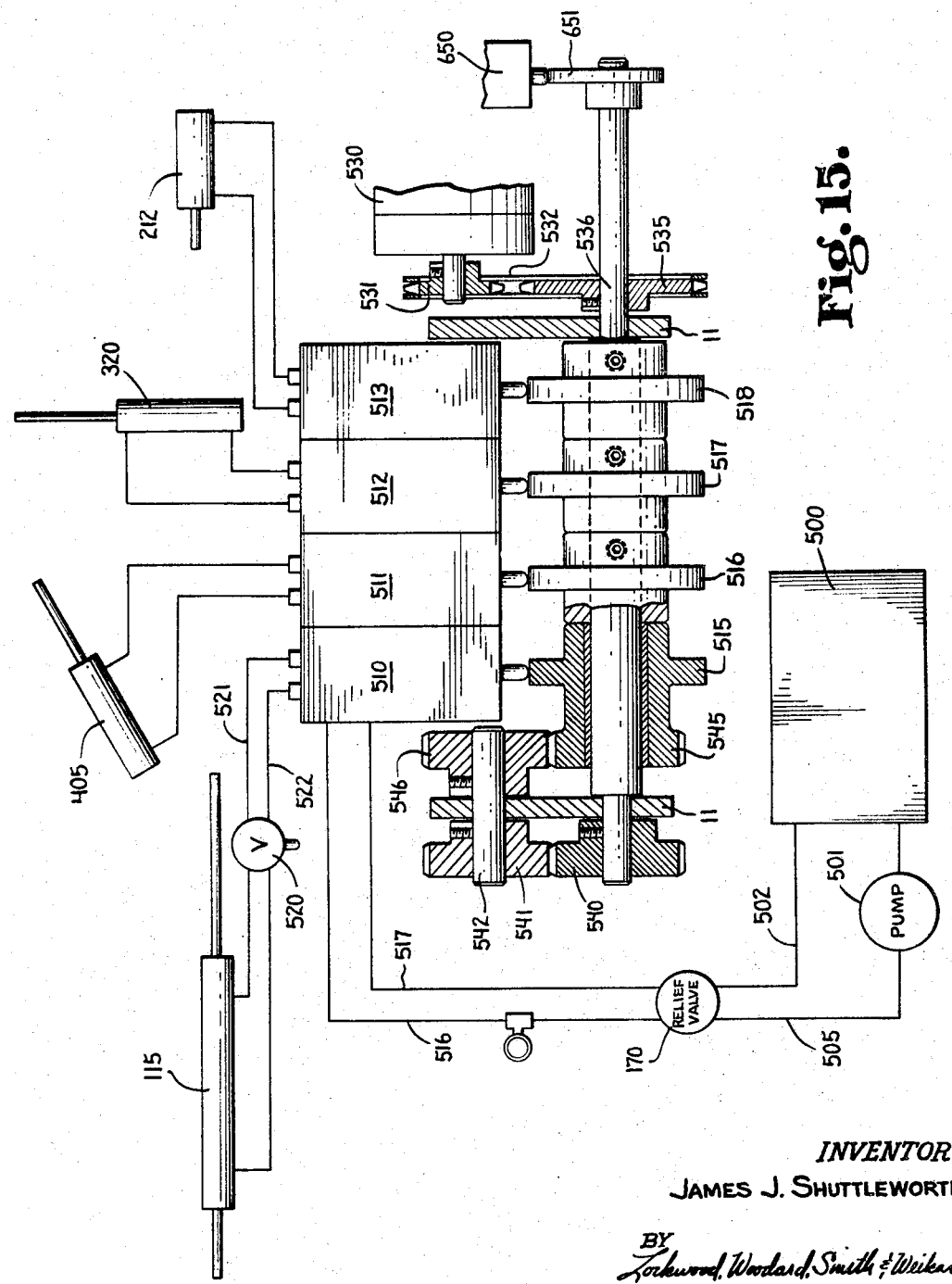

June 4, 1968  J. J. SHUTTLEWORTH  3,386,224
CASE PACKER

Filed Dec. 16, 1965  9 Sheets-Sheet 9

INVENTOR.
JAMES J. SHUTTLEWORTH

BY
Lakewood, Woodard, Smith & Whikart
Attorneys

United States Patent Office 3,386,224
Patented June 4, 1968

3,386,224
CASE PACKER
James J. Shuttleworth, 1300 Salamonie Ave.,
Huntington, Ind. 46750
Filed Dec. 16, 1965, Ser. No. 514,205
15 Claims. (Cl. 53—165)

The present invention relates to a case packer adapted for automatically packing cans, glass jars, bottles and other objects in a case or box and to certain subcombinations thereof.

Various types of apparatus have been conceived for packing objects in boxes. These apparatus have not been completely satisfactory in all respects. For example, some case packers require that vacuum cups be used to transport objects horizontally. Such horizontal transport tends to shake loose the objects interfering with the operation of the apparatus. Consequently, one object of the present invention is to provide a case packer so constructed that objects are moved by vacuum cups in only a vertical direction.

Another object of the invention is to provide an improved case packer.

Still another object of the invention is to provide a case packer incorporating means for holding down the flaps of boxes moving into and through the case packer.

Still another object of the invention is to provide a case packer capable of maintaining complete control of all of the flaps of a case being packed. Certain prior art case packers require that the carton be raised up to meet the containers as they are packed and control of the case flaps is lost.

Still a further object of the invention is to provide a case packer which places the containers in the box without shock.

A further object of the invention is to provide an automatic case packer the control system of which is relatively uncomplicated.

Still another object of the invention is to provide a case packer incorporating means for controlling the front or leading flap on the box or case.

Still a further object of the invention is to provide a case packer which is easily converted so as to deposit any desired number of layers in a box.

A further object of the invention is to provide a case packer which can be quickly converted to handle bottles, jars, cans, boxes and other types of containers of varying sizes.

Another object of the invention is to provide a case packer which incorporates improved means for assembling patterns for packing in the boxes.

Still another object of the invention is to provide a case packer arranged to maintain positive control of the containers during the entire packing process.

Related objects and advantages will be apparent as the description proceeds.

One embodiment of the invention might include a case packer comprising a platform in a first position, an object conveyer for conveying objects onto said platform, a first box conveyer operable to carry boxes to a loading position beneath said platform, a vacuum head positioned over said platform and incorporating a plurality of vacuum cups adapted to engage the individual objects for lifting thereof, means for moving said platform horizontally between a position adjacent said object conveyer and a removed position where it is no longer under said vacuum head, a funnel for guiding objects into said box, and cam means connecting said funnel and platform and arranged to force said funnel into said box when said platform moves into said removed position and to remove said funnel from said box when said platform moves into said first position.

The full nature of the invention will be understood from the accompanying drawings and the following description and claims.

FIG. 5 is an enlarged vertical section taken along the line 5—5 of FIG. 3 in the direction of the arrows.

FIG. 6 is an enlarged vertical section taken along the line 6—6 of FIG. 5 in the direction of the arrows.

FIG. 12 is is enlarged fragmentary side elevation taken from the right side of the apparatus as viewed in FIG. 3 with a cover plate removed to show internal operating apparatus.

FIG. 13 is a perspective fragmentary view of the operating portions of apparatus making up the box conveyor of the present invention.

FIG. 14 is a perspective view of a can or object platform or pan forming a part of the subject case packer.

FIG. 15 is a somewhat schemaitc view of the hydraulic circuit of the present invention.

Figure 1:
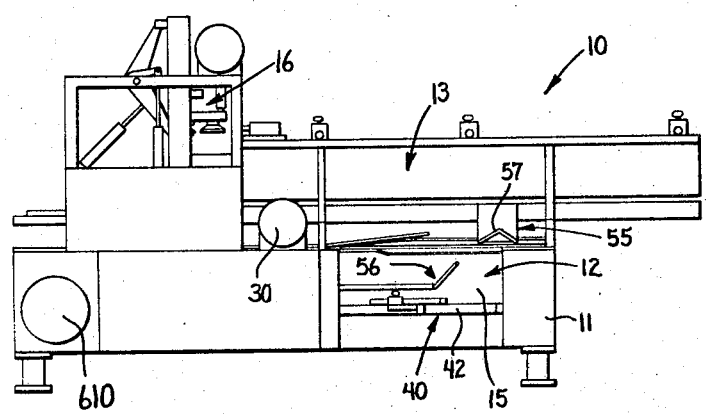
FIG. 1 is a front elevation of a case packer embodying the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

General operation

Referring now more particularly to the drawings, there is illustrated a case packer 10 which includes a frame 11. Mounted upon the frame 11 is a box conveyor 12 and a can or other object conveyor 13. Boxes are placed in the opening 15 on the box conveyor 12 and move inwardly to a position beneath the can conveyor 13. The boxes are then moved leftwardly as viewed in FIGS. 1 and 2 until they reach a position beneath a vertically movable vacuum head 16. The vacuum head 16 functions to lift a pattern of cans and then to move the cans downwardly into a respective box positioned beneath the vacuum head 16 and on the box conveyor 12.

Figure 2:
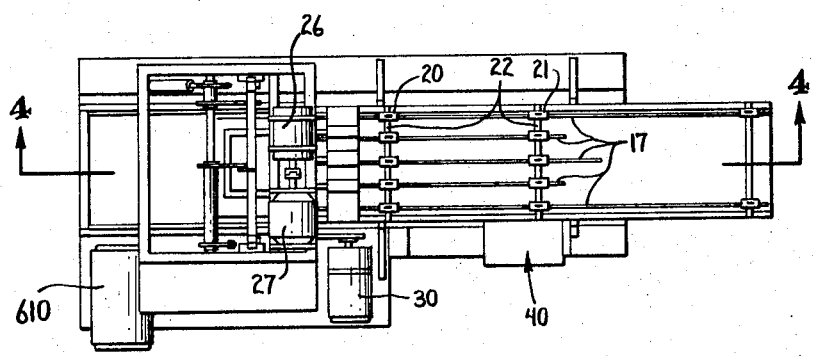
FIG. 2 is a top plan view of the case packer of FIG. 1.
Figure 3:
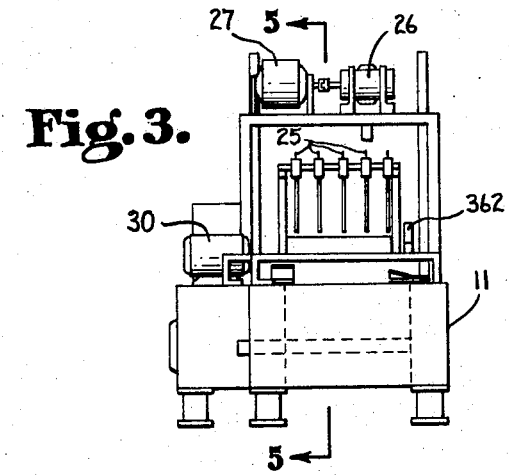
FIG. 3 is an end elevation of the structure of FIGS. 1 and 2.

The objects or cans moving on the conveyer 13 are guided into parallel lines by means of a plurality of guide elements 17 of varying lengths, each of said guide elements being fixed to a pair of mounting members 20 and 21. The mounting members are slidable upon a pair of horizontally extending rods 22 and can be adjusted at any desired position on said rods 22 by manipulation of cap screws 25. The rods 22 are fixed to the frame 11. When the guide members 17 are positioned, as shown in FIGS. 2 and 3, the machine is set for aligning four parallel rows of cans for movement beneath the vacuum head 16. Alternatively the guide members 17 might be arranged to guide two rows of cans or other objects as shown schematically in FIG. 9 (or any number of rows or objects). The vacuum head 16 is supplied with vacuum through a suitable vacuum pump 26 such as a ROOTS AF 24 pump, said pump being driven by suitable motor 27. The object or can conveyer 13 is driven by a suitable motor 30 in a manner described in more detail below.

Box conveyer

The box conveyer 12 actually consists of a pair of conveyers 40 and 41. The conveyer 40 comprises a belt 42 which extends around rollers 45 mounted on a carriage 46. The carriage 46 also supports the primary box conveyer 41 which includes a chain 47 having a plurality of bars 50 fixed to a chain and extending over and under the flat surface 51 defined by the main portion of the carriage 46. When the box is moved to the conveyer 41 and more particularly to the surface 51 by the conveyer 40, the flaps on the box are controlled by a U-shaped guide member 55 fixed to the frame above the second conveyer 40 and by a flap breaker arrangement 56. The U-shaped guide member 55 has a pointed base or distal end 57 which projects somewhat upwardly and somewhat outwardly away from the case packer. When a box is placed upon the conveyer 40, the U-shaped member 55 guides three of the flaps of the box into an outwardly projecting position, these three flaps being the flaps which extend, respectively, rightwardly, toward and away from the viewer of FIG. 1.

The flap breaker 56 incorporates a member 60 which projects from a location 61 closely alongside the box to its distal end 62 just above the edge of the box. The member 60 of the flap breaker functions to push the box against a flange 65 on the carriage 46 and to break the forward flap 66 of the box (that is, the flap which extends leftwardly as viewed in FIG. 1), down against the side of the box bending the flap sufficiently so that it will retain the somewhat downwardly extending position shown in FIG. 4. The lateral position of the flap breaker 56 can be adjusted by means of a thumb screw 67 to move the flap breaker 56 horizontally upon a vertically extending post 70 fixed to the carriage 46. Further guide apparatus 71 is adjustably fixed to the carriage 46 and functions similarly to the flap breaker to hold the box against the flange 65 as the box moves into the conveyer 41.

Figure 4:
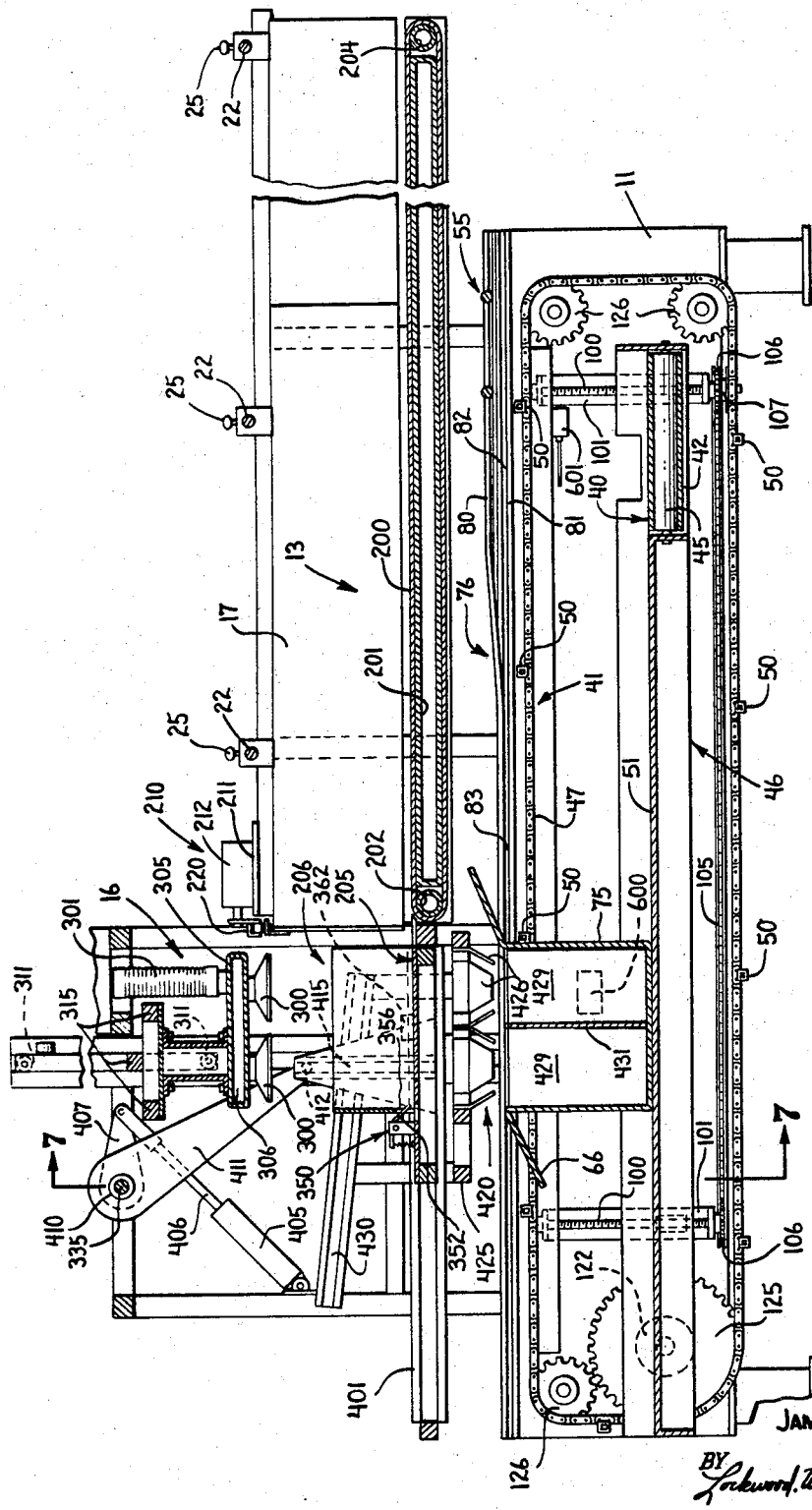
FIG. 4 is an enlarged vertical section taken along the line 4—4 of FIG. 2 in the direction of the arrows.
Figure 7:
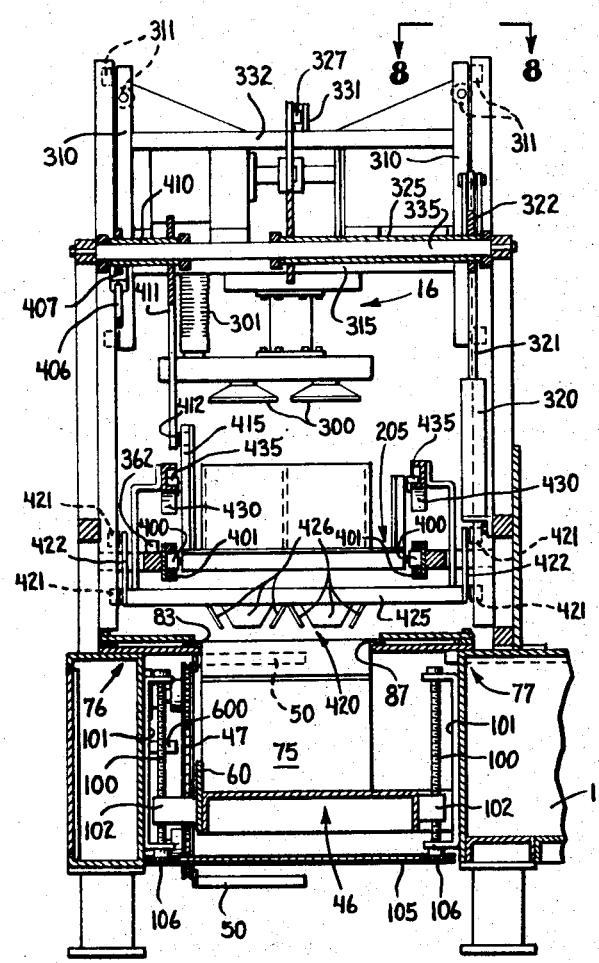
FIG. 7 is a vertical section taken along the line 7—7 of FIG. 4 in the direction of the arrows.

After the box has moved into the case packer as far as it is going to travel on the conveyer 40, the box is moved leftwardly as viewed in FIGS. 1 and 2 by means of the conveyer 41. Thus, the bars 50 of the conveyer 41 step the box leftwardly as viewed in FIG. 4 until it is positioned directly beneath the vacuum head 16. Although only one box is shown in FIG. 4 for clarity's sake, a plurality of boxes will be arranged in order in front of each of the two bars 50 directly to the rear of the bar against which the box 75 is positioned in FIG. 4. Boxes will be fed continuously to the conveyer 41 by the conveyer 40. The two side flaps on the box, that is, the two flaps toward and away from the viewer of FIG. 4, are guided in a horizontal outwardly extending position by flap guide means 76 and 77 (FIG. 7). The U-shaped flap guide 55 is fixed to the flap guide means 76 as shown in FIG. 4 and guides the sideward flap away from the viewer of FIG. 4 between a pair of parallel members 80 and 81 (FIG. 4). It will be noted that the members 80 and 81 are spaced apart a relatively greater distance at 82 than they are at 83 in order to prevent the flap missing the slot between the two members 80 and 81 as the box is moving on the conveyer 40.

The flap which is toward the viewer of FIG. 4 is picked up by the flap guide means 77 after the box has completed its movement on the conveyer 40. FIG. 5 perhaps best shows the diverging members 85 and 86 which guide the sideward flap of the box into the slot 87 of the guide means 77. Referring to FIG. 7, the slots 83 and 87 are shown as being directly opposite and opening toward one another. It will also be noted that the guide members 76 and 77 are fixed to the frame 11 and not to the carriage 46. The details of a representative one of the flap guide members 76 and 77 are shown in FIG. 6. It can be seen that the members 85 and 86 are fixed in spaced relation by means of bolts 88 which extend through suitable apertures in the members 85 and 86 and through a spacer washer 90. The bolts 88 are fixed to a slide element 91 which is slidable in a sleeve 92 welded to the frame 11. The slide 91 is fixed in position by screw 95 which is threaded into the re-enforced portion of the sleeve 92. It can be appreciated that the flap guide members 76 and 77 are adjustable, therefore, in a horizontal direction but not in a vertical direction.

The carriage 46 is mounted upon the frame 11 and is vertically adjustable relative to the frame by means of screws 100, each of which is journalled in a respective yoke 101 fixed to one side or the other of the frame 11. Each of the screws 100 extends through a projection fixed to and extending from the carriage 46. A chain 105 extends around sprockets 106 each of which is fixed to a respective one of the screws 100. A further sprocket 107 is fixed to one of the screws 100 and is driven through chain 108 and sprocket 109 fixedly mounted on the drive shaft of a motor 110 fixed to the frame 11. The carriage may be raised or lowered by operating the motor 110 in one direction or the other. Since the flap guide means 76 and 77 are not vertically adjustable, any vertical adjustment necessary for different depths of boxes is made by means of the motor 110 and screws 100.

The conveyer 41 is powered by a hydraulic cylinder 115 (FIG. 12), said hydraulic cylinder having a piston 116 which extends completely through the cylinder 115 and is movable between the solid line position of FIG. 12 and the dotted line position thereof. A chain 117 is engaged around sprockets 120 and 121 rotatably mounted upon the frame 11. The sprocket 121 is fixedly secured to a one-way clutch 122 which couples the sprocket 121 and a further sprocket 125 also rotatably mounted upon the frame 11. The further sprocket 125 along with additional sprockets 126 (FIGS. 4 and 12) has the chain 47 engaged thereon. As mentioned above, the chain 47 has the bars 50 fixed thereto and is used to step the boxes forwardly to their loading position and out of the apparatus. This stepping action is effected by projecting and retracting the piston 116, that is, by moving the piston 116 between the solid and dotted line position of FIG. 12.

When the piston 116 is moved from the dotted line to the solid line position, there is no movement of the chain 47 because of the free wheeling of the one-way clutch 122. When the piston is moved from the solid line to the dotted line position, however, the bars 50 are advanced by the chain 47 one complete position. That is, one of the bars 50 moves to the position previously occupied by a next adjacent bar 50. This stepping action is accurately metered by means of a mechanism 130 (FIGS. 12 and 13). The mechanism 130 consists of an element 131 swingably mounted on the frame 11 about an axis 132 and a further element 135 swingably mounted on the frame 11 about an axis 136. The element 131 consists of the two levers 137 and 140 which are fixed together by the member 141. It will be noted that the member 140 has a hook 142 in its distal end, said hook cradling the lever 145 forming a part of the element 135. The element 135 further includes a stop member 146 which is fixed to the lever 145 by the member 147.

Assume now that the cylinder 115 moves the piston 116 from the solid to the dotted line position. This will also cause the dog 160 fixed to the chain 117 to move rightwardly and to engage the member 161 fixed to the lever 137. Thus, the lever 137 will be moved rightwardly as viewed in FIG. 12 swinging the lever 140 with its hook 142 upwardly forcing the lever 145 upwardly and causing the stop member 146 to swing downwardly in front of the next bar 50. The dog 160 is so located on the chain 117 that it engages the member 161 just prior to the piston 116 completing its stroke. Thus, when the bar 50 engages the stop 146 stopping the bar 50 and the chain 47, the piston 116 cannot complete its possible stroke and the pressure in the hydraulic cylinder 115 is relieved by a suitable relief valve 170 (FIG. 15).

In FIG. 12 the member 161 is shown engaged by a further dog 171. This engagement occurs when the piston 116 is completing its stroke rightwardly as viewed in FIG. 12 and moving to the solid line position. As mentioned, the chain 47 does not move. When the dog 171 engages the member 161, the stop 146 is moved out of the way of the bar 50 so that the next forward movement of the chain 47 is permitted. It will be noted that when the box 75 is in the position shown in FIG. 4, it is ready for loading by the vacuum head 16. After such loading, the box is stepped leftwardly as viewed in FIG. 4 until it moves off of the surface 51 of the carriage 46 and empty boxes are simultaneously stepped into loading position. Suitable means for receiving the boxes being stepped off the conveyer should be provided.

*Can conveyer*

The can conveyer 13 includes a belt 200 which is supported by an elongated support assembly 201 and which rides upon rollers 202 and 204. The roller 202 is driven by the motor 30 which operates to continually move the upper portion of the belt 200 leftwardly as viewed in FIG. 4. A pan or platform 205 (shown in detail in FIG. 14) is aligned with and adjacent to the conveyor 13 when the platform is in the position of FIG. 4. The platform 205 has fixedly mounted thereon a can pattern forming assembly 206 which consists of four vertical plates 207 welded to one another to define an open sided configuration. Of course, depending on the number of rows of cans more or less plates 207 might be used. Preferably each case packer is provided with a plurality of the platforms 205 so that the apparatus can be connected for different can patterns. The cans are moved onto the platform 205 by the conveyer 13 so that the four leftward cans in FIG. 9 assume the position shown in dotted lines in FIG. 9. Unlike the example shown in FIGS. 1, 2 and 3, the case packer of the remaining figures is shown with only two parallel rows of relatively large cans instead of the four parallel rows for smaller cans shown in FIGS. 1, 2 and 3.

Figure 9:
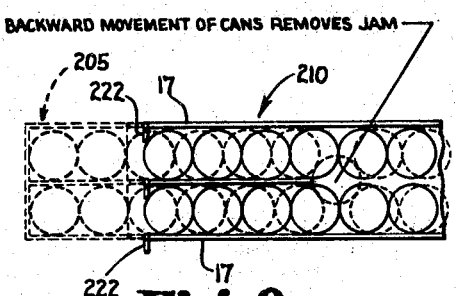
FIG. 9 is a somewhat schematic top plan view of the object conveyer forming a part of the present invention.
Figure 10:
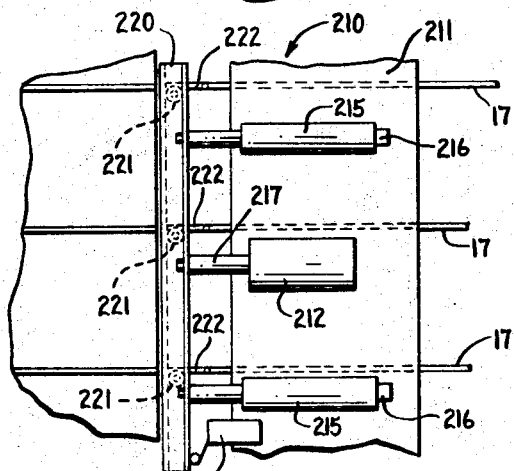
FIG. 10 is a fragmentary enlarged top plan view of a portion of the structure illustrated in FIG. 2.
Figure 11:
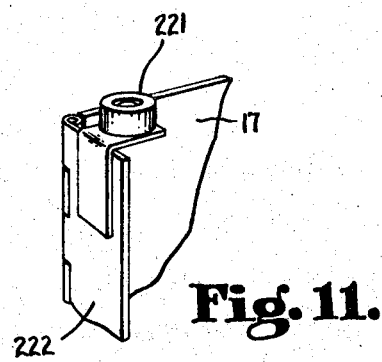
FIG. 11 is a fragmentary perspective view of a gate forming a part of the structure illustrated in FIG. 9.

Referring to FIGS. 9 and 10, the cans which are resting on the conveyer 13 must be held in position temporarily while the cans on the platform 205 are packed into the box. This holding is accomplished by the holdback mechanism 210 illustrated in FIGS. 9, 10 and 11. The frame 11 has fixed thereto a horizontal flat member 211 which has a hydraulic cylinder 212 fixed to its upper surface. Also fixed to the upper surface of the member 211 are guide bushings 215 within which guide rods 216 reciprocate. The rods 216 and the piston 217 of the hydraulic cylinder 212 are fixed to a channel member 220 (FIG. 4), the channel of which opens downwardly and receives rollers 221 rotatably mounted upon doors or gates 222. When the piston 217 of the hydraulic cylinder 212 is projected, the channel 220 moves the rollers 221 to cause the doors 222 to move to a position in alignment with the guide members 17. This is the position in which the doors are located when the cans are moving onto the platform 205. When it is desired to stop the cans, the hydraulic cylinder 212 retracts its piston 217 causing the doors 222 to move to the solid line position illustrated in FIG. 9 and in FIG. 11. When the doors move to the position of FIGS. 9 and 11, the containers (jars, bottles or cans) are moved backwards on the conveyer 13. As the cans move back in the lanes, they break up any bridging or jamming which may form where the containers are divided into individual lanes.

It will be noted that the doors have a sufficiently small dimension between their proximal and distal ends so that they can clear the cans already moved onto the platform. The doors 222 have a sufficiently great dimension, however, between their distal and proximal ends in order to block further movement of the cans on the conveyer 13.

*Vacuum head and funnel*

Figure 8:
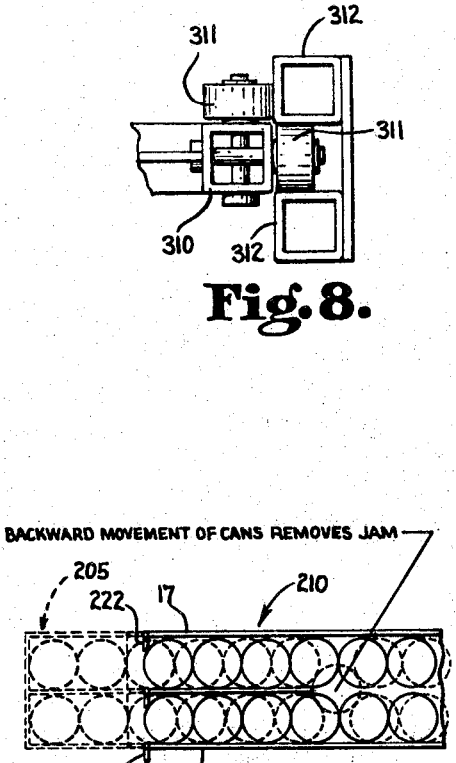
FIG. 8 is an enlarged horizontal section taken along the line 8—8 of FIG. 7 in the direction of the arrows.

In order for the cans to be moved into the box 75, the vacuum head 16 must come down to the cans and engage the cans by means of vacuum cups 300. The cups 300 must then raise the cans away from the platform and the platform move out of the way so that the vacuum head can lower the cans down into the box 75. Because the vacuum head 16 must move relative to the vacuum pump 26, the vacuum head is connected to the pump by a bellows-type conduit 301 which automatically lengthens and shortens with movement of the vacuum head. The vacuum head 16 includes a housing 305 which has a hollow interior 306 leading to the vacuum cups 300. The vacuum head 16 further includes a pair of vertical members 310 each of which has four rollers 311 rotatably mounted thereon. FIG. 8 shows the rollers on one side of the head as representative of both sides of the head. As shown in FIG. 8, the rollers 311 ride between and against vertical members 312 fixed to the frame and defining a track arrangement. Two of the rollers 311 ride between the members 312 while two ride against one of the members 312. The hollow housing 305 of the head is fixed to the vertically extending members 310 by a suitable supporting assembly which includes horizontally extending rods 315. A plurality of different sized and shaped vacuum heads may be supplied for different patterns or sizes of containers.

The vacuum head is raised and lowered by a hydraulic cylinder 320, the piston 321 of which is pivotally connected to a lever 322 which is fixed to a sleeve 325, in turn fixed to a further lever 326. The further lever 326 has rotatably mounted at its distal end a roller 327 which rides in a track 330 in a channel 331 fixed to the horizontal member 332 forming a part of the vacuum head 16. The shaft 335 fixed to the frame 11 provides means for pivotally mounting the sleeve 325. The vacuum head 16 may be raised and lowered by projecting and retracting respectively the piston 321 of the hydraulic cylinder 32. Because of the relatively greater moment arm of the lever 326 as compared to the lever 322, substantially greater movement of the vacuum head 16 is produced as compared to the movement of the piston 321.

Referring again to FIG. 14, the platform 205 has additionally mounted thereon a yoke 350 having a shaft 351 rotatably mounted therebetween. A pair of actuating arms 352 are each rotatably mounted on the rod 351 and are normally retained in an upward position by springs 355 or in other words clockwise position as viewed in FIG. 5. As shown in FIG. 4, the actuating arms 352 extend through apertures 356 inside of the pattern forming assembly 206 where the arms 352 can be engaged by the cans in the pattern. Fixed to the shaft 351 are additional arms 353 and 354. The arm 353 has a tension spring 359 connected between it and the platform 205. The spring 359 is sufficiently strong to cause the lever arm 360 to move downwardly depressing the actuating arm 361 of the switch 362 only when the arms 352 are moved out of contact with the arms 353 and 354 by a can pattern in the platform 205. In other words the spring 359 is weaker than each of the individual springs 355.

The platform 205 is movable horizontally by reason of its four rollers 400 (FIG. 7) which support the platform in horizontal position and ride within the tracks 401 mounted on the frame 11. The platform 205 is moved by means of a hydraulic cylinder 405 having a piston 406, the distal end of which is pivotally connected to a lever 407. The lever 407 is fixed to a sleeve 410 which is journalled upon the shaft 355. Also fixed to the sleeve 410 is a lever 411 at the distal end of which is mounted a roller 412 which rides within the vertically extending track 415 fixed to the platform 205. When the piston 406 is retracted, the lever 411 is rotated clockwise as viewed in FIG. 4 causing the platform 205 to move leftwardly in the tracks 401 and away from the conveyer 13.

A funnel arrangement 420 is provided with vertically spaced rollers 421 which ride within the tracks defined by the vertical members 312, in other words, the same tracks within which the rollers 311 ride. Because the mounting members 422 upon which the rollers 421 are rotatably mounted are fixed to the funnel, the funnel is movable only in a vertical direction. The funnel consists of the frame members 425 and the funnel elements per se 426 which taper inwardly and are designed to guide the cans into the particular openings 429 in the box 75, said openings being defined by the partition 431. The funnel 420 also functions to hold the box in position when loading of the box is being effected. The funnel is automatically moved down into the loading position when the platform 205 moves away from the position illustrated in FIG. 4 and leftwardly toward the end of the track 401. This automatic movement is accomplished by means of a pair of cam tracks 430 which are fixedly mounted on the funnel and which slope upwardly and leftwardly as viewed in FIG. 4. The platform 205 has rotatably mounted thereon rollers 435 which ride in the cam tracks 430 as the platform moves leftwardly as viewed in FIG. 4. Of course, rightward movement of the platform 205 as viewed in FIG. 4 causes the funnel to be raised from the downward position shown in FIG. 5 to the upward position shown in FIG. 4.

*Hydraulic system*

Referring to FIG. 15, there is illustrated the hydraulic system of the present apparatus which includes a hydraulic tank 500 and a pump 501. The pump 501 is connected to the relief valve 170 through which hydraulic fluid can be returned to the tank through the line 502 when the pressure in the line 505 becomes too great. Pressurized hydraulic fluid from the pump 501 is delivered to four-way valves 510, 511, 512 and 513 through line 516 and returned to the tank through lines 517 and 502. The four-way valves 510, 511, 512 and 513 are actuated by means of respective cams 515, 516, 517 and 518. A further four-way valve 520 is placed in the lines 521 and 522 leading to and from the hydraulic cylinder 115 which operates to index the boxes forwardly into and through loading position. The four-way valves 510–513 may be, for example, #25 P(EE) Gresen hydraulic valves.

The four-way valve 511 controls flow of hydraulic fluid to the hydraulic cylinder 405 which retracts the platform 205. The four-way valve 512 controls flow of hydraulic fluid to the hydraulic cylinder 320 which raises and lowers the vacuum head 316. The four-way valve 513 controls flow of hydraulic fluid to the hydraulic cylinder 212 which controls the doors or gates 222. One of the important advantages of the present case packer is the fact that the indexing of the boxes can be slowed down so that two or more layers of cans or other objects are packed into a single box. This is accomplished by causing the four-way valve 510 to complete only one cycle for every two or more cycles of the four-way valves 511–513.

The motor 530 is provided with a sprocket 531 which drives a chain 532 which in turn drives a sprocket 535. The sprocket 535 is fixed to a shaft 536 rotatably mounted on the frame 11. As shown in FIG. 15, the gears 540 and 541 are equal in size and have an equal number of teeth. These gears can be replaced, however, by a smaller gear for the gear 540 and a larger gear for the gear 541, said replacement gears having a two to one gear ratio so that shaft 542 rotatably mounted on the frame 11 rotates once for each two rotations of the shaft 536. The cam 515 is integral with a gear 545 which is driven by gear 546 fixed to the shaft 542. Gear 545 is journalled on shaft 536 so that cam 515 and gear 545 are free to rotate at one half the speed of the shaft 536. The latter described arrangement is suitable for providing two layers of cans or objects in a box being packed. Of course, different replacement gears with the proper gear ratios can replace gears 540 and 541 for packing three, four, five or more layers.

Figure 16:
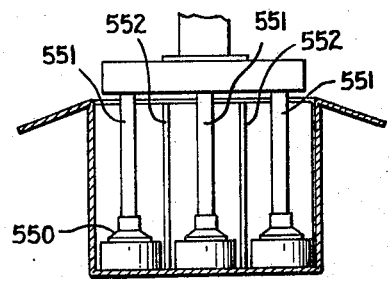
FIG. 16 is a side elevation of an alternative vacuum head usable with the present invention showing its possible stroke into a partitioned box.

It should be understood that the intended stroke of the vacuum head 16 is down to the box so that the vacuum head carries the first layer almost all the way into its intended location in the box. When a second and more layers are packed, the vacuum head 16 stalls out against the first and any preceding layers. In other words, the possible stroke of the hydraulic cylinder 320 is not completely used and the relief valve 170 prevents the hydraulic pressure from becoming unduly great. Referring to FIG. 16, where more than one layer of objects is packed in a box, the vacuum cups 300 may be replaced by vacuum cups 550 which are mounted on extensions 551 so that the vacuum cups 550 can extend down into the box in the situation that partitions 552 are used on the box. Of course, in some situations, there will be no partitions 552 and the extensions 551 may not be necessary.

*Electrical circuit and operation*

Various limit switches in addition to limit switch 362 are provided for sensing the various operating positions of the apparatus. Referring to FIGS. 3 and 4, the limit switch 362 is located on the side of the case packer adjacent to the platform 205 and is mounted on the frame 11. As mentioned, the function of the limit switch 362 is to indicate when the pattern of cans in the pan or platform is complete and is ready to be lowered into the box or carton.

Figure 17:
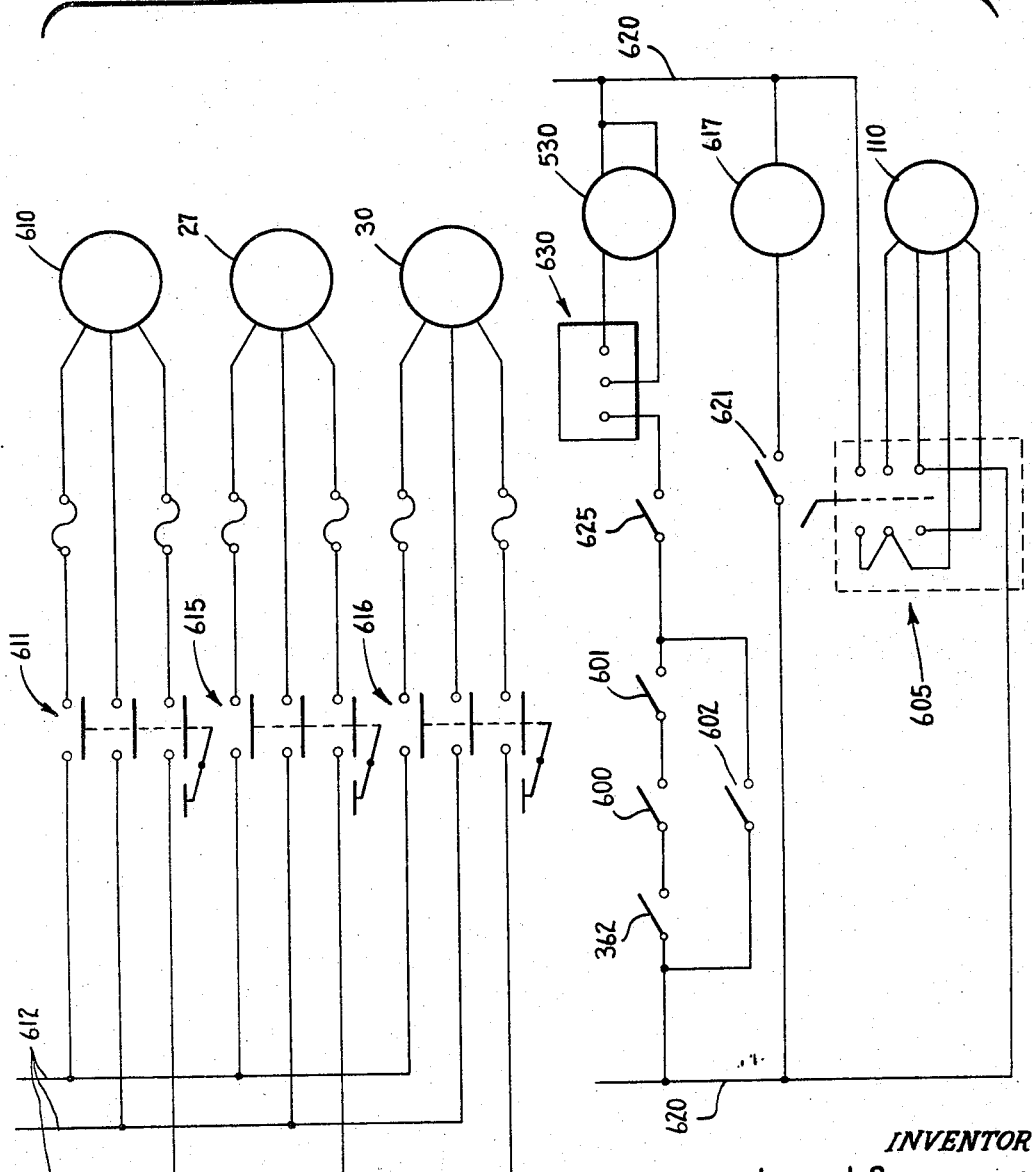
FIG. 17 is a schematic view of the electrical circuit of the present invention.

A further limit switch 600 (FIGS. 4 and 17) is also mounted upon the frame 11 and has its actuating arm positioned to be engaged by a box or carton such as the carton 75 when the box or carton is positioned in the loading position as shown in FIG. 5. The limit switch 600 functions to indicate when the carton is properly positioned in the loading position. A further limit switch 601 (FIGS. 4 and 17) is positioned at the end of travel of a box moving on the conveyor 40. The purpose of the limit switch 601 is to indicate when a carton is in proper position to be indexed by the conveyor 41. A further limit switch 602 (FIGS. 10 and 17) is mounted upon the horizontal flat member 211 and has its actuating arm positioned to be operated by the channel member 220. The limit switch 602 indicates or is closed when the gate or doors 222 are closed and preventing further movement of the cans on the conveyor 13. As can be seen in FIG. 17, the limit switch 602 is in parallel with switches 362, 600 and 601 so that during certain portions of the cycle operation of the swich 602 overrides operation of switches 362, 600 and 601.

The electrical circuit of the present mechanism will be described in further detail in connection with a description of the operation of the device. The carriage 46 is adjusted to the proper height by operation of the motor 110. As shown in FIG. 17, a reversing switch 605 is provided which can be manipulated to cause the motor 110 to raise or lower the carriage 46. When the carriage 46 is properly adjusted to the desired height for the boxes or cartons to be used, the switch 605 is set so that the motor 110 is turned off. The motor 110 does not operate during the case packing cycle. The switch 605 may be a commercially available AB reversing drum 350 TAV 32 manufactured by the Allen Bradley Company of Milwaukee, Wis.

The hydraulic pump motor 610 which drives the hydraulic pump 501 is then turned on by manipulation of the switch 611 connecting the motor 610 across the 220 volt three-phase supply lines 612. Hydraulic fluid under pressure is then supplied to the four-way valves 510, 511, 512 and 513. The vacuum pump motor 27 is then turned on by means of the switch 615 connecting the motor 27 across the lines 612. Also, the can conveyer motor 30 is started in similar fashion by throwing the switch 616.

A further motor 617 (FIG. 17) is provided for driving the conveyer 40 in order to move boxes onto the conveyer carriage 46. The motor 617 is connected across 110 volt lines 620 by closing the switch 621.

At this stage in the operation of the present device, cam 515 is in its uppermost position having just caused valve 510 to have indexed out a full box. Cam 516 has allowed the valve 511 to force the platform or pan 205 to the position illustrated in FIG. 4 adjacent to the conveyer 13. Cam 517 holds valve 512 open so that the vacuum head assembly 16 is in the raised position of FIG. 4.

A box is placed upon the conveyer 40 and moves into the conveyer 41 into engagement with the limit switch 601 closing the contacts of the limit switch. This box or carton is then indexed to the next forward station on the conveyer 41 by manually operating the hydraulic valve 520. The above steps of feeding in cartons on the conveyer 40 and indexing them on the conveyer 41 are repeated until such time as the lead carton is in loading position as shown by the carton 75 in FIG. 4 with the carton directly under the platform 205 and under the vacuum head 16. In this position, the limit switch 600 is closed by the engagement of the box 75 with the limit switch actuating arm closing the contacts of the limit switch 600.

The operator then throws switch 625 which is in series with the limit switches 600 and 601 and also in series with the limit switch 362. Closing of the switch 625 does not operate the cam motor 530 until such time as the limit switch 362 is closed by the proper forming of a pattern of cans on the platform 205. When all of the switches 362, 600 and 601 are closed, the cam motor 530 will be operated through the starting relay 630 and from the 110 volt supply line 620.

When the cams begin to rotate, the cam 518 actuates the actuating arm of the four-way valve 513 causing the hydraulic cylinder 212 to retract its piston 317 and to close the gates 222. This action, as mentioned, breaks up any jams in the cans on the conveyer 13 by backward movement of the cans and also prevents any further movement of the cans off of the conveyer 13. The vacuum head 16 is also caused to descend by operation of the four-way valve 512 through the cam 517 which in turn provides hydraulic fluid to the cylinder 320. The operation of the hydraulic cylinder 212 to retract its piston and to move the channel 220 rightwardly also actuates the switch 602, said switch 602 being in parallel with the series connection of switches 362, 600 and 601, thus locking in the cam motor 530 even though one or more of the switches 362, 600 and 601 subsequently opens. The vacuum pump 26 normally exerts vacuum on the vacuum cups 300 except when the vacuum is cut off by operation of a suitable valve 650 controlled by the cam 651. The valve 650 is caused to shut off vacuum only when the cups 300 release the cans. The cam 517 is so designed as to reverse the four-way valve 512 after the cans have been engaged by the vacuum cups so that the vacuum head raises slightly and lifts the can away from the platform 205.

Just after the cans have been lifted off of the platform, the cylinder 405 is caused to move the platform leftwardly as viewed in FIG. 4 by the cam 516 actuating the four-way valve 511. As explained above, such leftward movement on the platform automatically drops or move downwardly the funnel 420 to appropriate position to guide the cans into the box. When the platform reaches fully retrated position and the funnel 420 is moved fully downwardly, the cam 517 suitably actuates the valve 512 to operate the cylinder 320 to lower the pattern of cans through the funnel into the carton. At the bottom of the stroke of the vacuum head, the above mentioned vacuum valve is actuated by the cam 651 to port the vacuum head to asmosphere and to shut off the vacuum so that the can pattern is released into the box. The cam 517 also operates the valve 512 to cause the cylinder 320 to retract the vacuum head back to its uppermost position. Immediately after the upward movement of the vacuum head out of the way of the platform 205, the cylinder 405 is operated through the cam 516 and the four-way valve 511 to move the platform from the position of FIG. 5 back to the position of FIG. 4. Continued rotation of the cams causes the cam 515 to actuate the cylinder 115 through the four-way valve 510 to project the piston 116 from the solid line position to the dotted line position of FIG. 12 indexing the now loaded box 75 leftwardly from the position of FIG. 4 and replacing the now loaded box 75 with an empty box. The cam 515 is so designed that it next operates the four-way valve 510 to return the piston 116 from the dotted line position to the solid line position of FIG. 12.

The final function of the cycle is completed as the gates or doors 222 are opened by projecting of the piston 217 of the hydraulic cylinder 212 by operation of the four-way valve 513 through the cam 518. The opening of the doors 222 permits the cans to again be moved onto the platform to begin the filling up of the pattern. When the gates or doors 222 open, the switch 602 is also caused to open which shuts off the cam motor 530 so that the cycle cannot be repeated until such time as the three switches 362, 600 and 601 are closed by the respective filling of the platform with cans, proper positioning of the empty box in loading position and movement of an empty box on the conveyer 40 into indexing position for movement on the conveyer 41.

Figure 18:
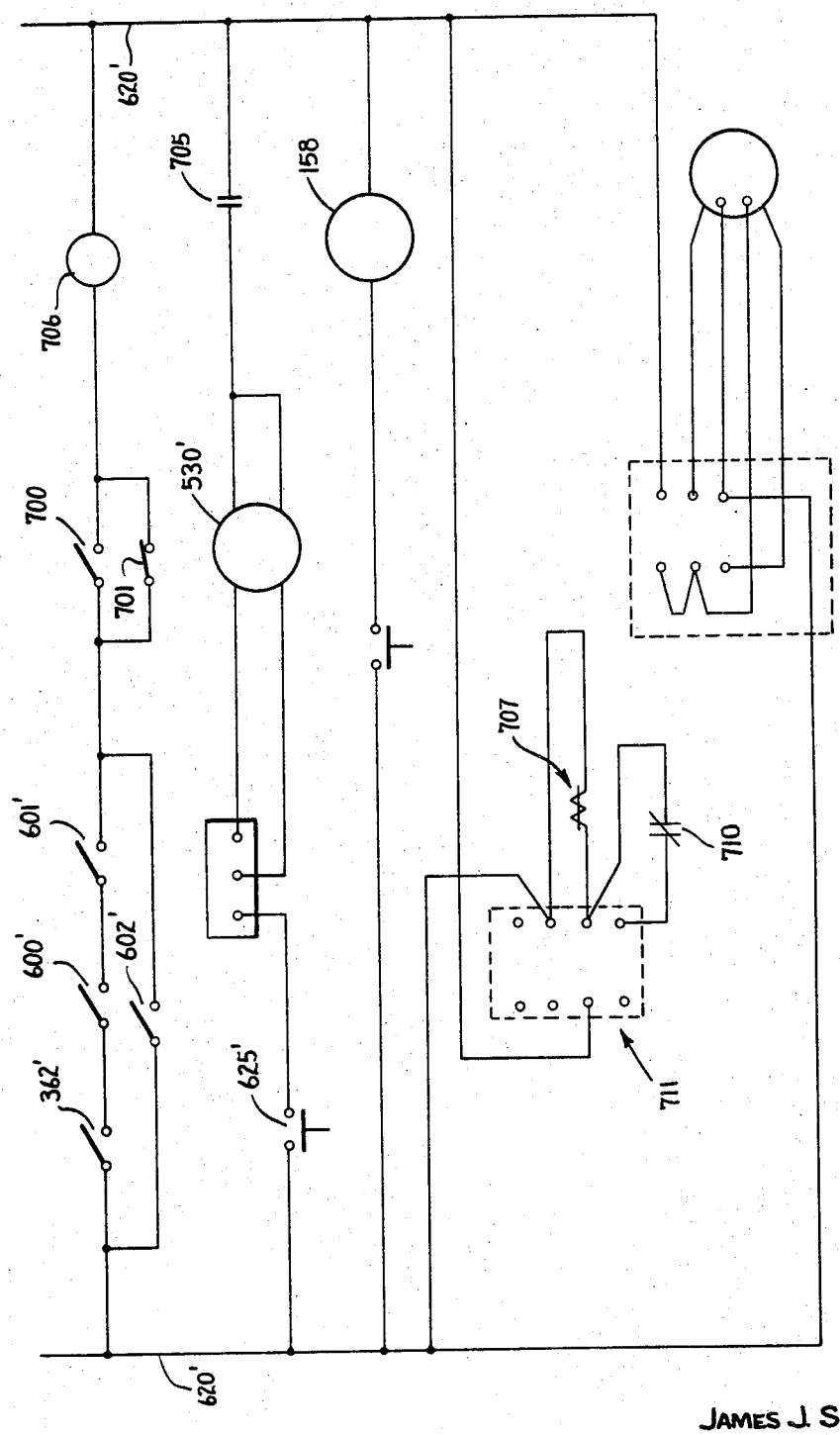
FIG. 18 is a schematic view of the electrical circuit of the alternative embodiment of the present invention.

An alternative embodiment of the electrical circuit of the present invention is illustrated in FIG. 18. The embodiment illustrated in FIG. 18 is intended primarily for use with glass containers instead of with cans. Such glass containers must be carefully handled or else they will be broken. Consequently, the circuit of FIG. 18 provides cerain safety features which stop further operation of the case packer when accidents or mistakes in the operation occur. The circuit of FIG. 18 is identical to the circuit of FIG. 17 except that an additional pair of limit switches 700 and 701 are positioned in series with limit switches 362′, 600′, 601′ and 602′ corresponding to the above mentioned limit switches 362, 600, 601 and 602. Also, instead of placing the cam motor 530′ in series with the limit switches, the cam motor is placed separately across the power lines 620′ and is controlled by normally open contacts 705 of a relay 706 in series with the limit switches. Also connected across the power line 620′ is a brake 707 for the cam shaft 536. The relay 706 has a normally closed set of contacts 710 in series with the brake 707. Also in series with the brake 707 is a rectifier 711 which converts the alternating current voltage from the power lines 620′ to direct current. It can be appreciated that the brake 707 is automatically engaged whenever the contacts 705 are opened breaking the circuit to the motor 530′. Also the brake 707 is released whenever the contacts 705 are closed (and contacts 710 opened by relay 706) and the cam motor 530′ is operating. The rectifier 711 is a commercially available rectifier control #540024 manufactured by Warner Electric Brake and Clutch Company of Beloit, Wis.

The purpose of the limit switches 700 and 701 is to prevent operation of the apparatus in the event that the vacuum head does not make a complete downward stroke with its bottles. The limit switch 700 is mounted on the frame of the case packer and senses the position of the head. The limit switch 700 closes at the time that the head fully projects and not before. The limit switch 701, on the other hand, is mounted adjacent to the cam arrangement of FIG. 15 and is open at a time corresponding to the positioning of the cam 517 to cause the head to be almost completely projected to its downward position. Thus, if for some reason the vacuum head is stopped prior to reaching its full stroke, the limit switch 701 will open (and switch 700 will remain open) operating the relay 706 to shut off the cam motor 530 by opening the contacts 705 and to turn on the brake 707 by closing the contacts 710. This operation in effect shuts off any further movement of the platform and thus prevents breakage of bottles when a malfunction has occurred.

Figure 19:
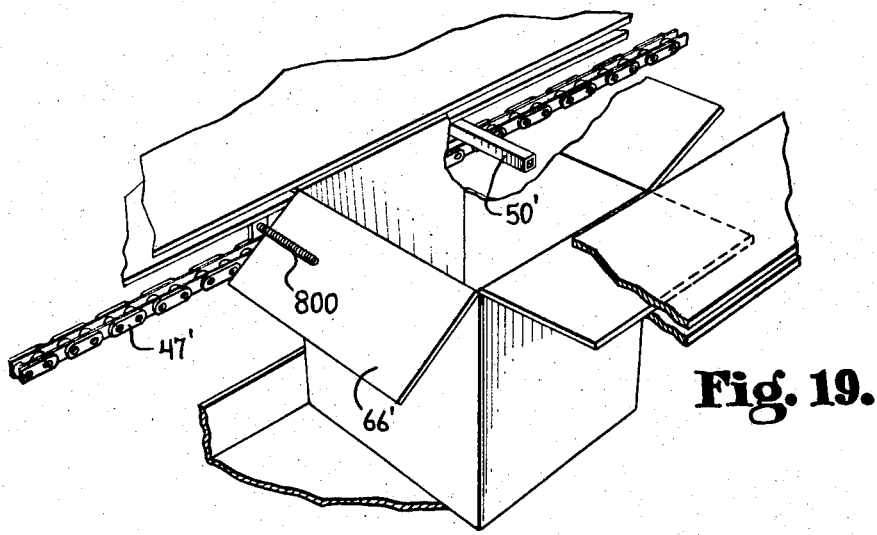
FIG. 19 is a perspective view of an alternative embodiment of the invention.
Figure 20:
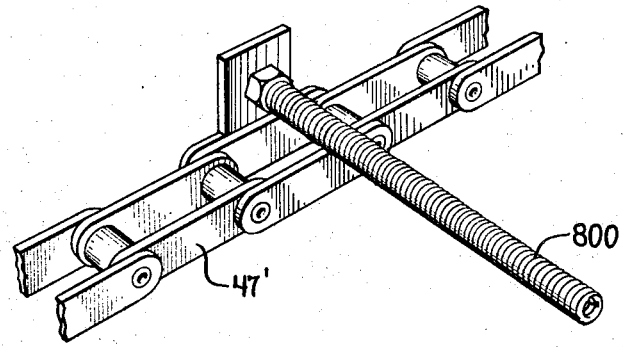
FIG. 20 is an enlarged perspective view of a portion of the structure of FIG. 19.

Referring to FIGS. 19 and 20, an alternative embodiment of the invention is illustrated. The embodiment of FIGS. 19 and 20 is identical to that of FIGS. 1–18 except that cantilever springs 800 (only one shown) are used and are fixedly mounted at their proximal ends to the chain 47' corresponding to chain 47. Each of the springs 800 are tightly coiled so that they normally maintain themselves rigid to hold down the leading flap 66' which corresponds to the flap 66 in FIGS. 4 and 5. Each of the springs 800 is appropriately and equally spaced from a respective one of the bars 50' corresponding to the bars 50 of FIGS. 4 and 12. Thus the flap breaker 56 of FIG. 5 acts to feed the lead flap 66' behind the respective springs 800. The advantage of using the spring 800 instead of a completely rigid member is that the spring can bend and move past the box at the end of travel of the conveyer 41. The embodiment of FIGS. 19 and 20 is particularly useful in the frequent situation wherein the box flap 66 or 66' cannot be or should not be overbent as described above in connection with FIGS. 1–18. The spring holds the lead flap down and makes unnecessary such overbending. It should be mentioned that because the springs are mounted on chain links they can be easily relocated to provide for different sized boxes.

It will be evident from the above description that the present invention provides an improved case packer incorporating means locating flaps of boxes in open position while moving into the case packer. It will also be evident that the present invention provides an automatic case packer, the control system of which is relatively uncomplicated by reason of its substantial use of cams. One important advantage found in the use of cams is the fact that the various pistons of the hydraulic cylinders can be controlled in such a way that they decelerate at the end of their strokes. This feature has been found to make possible much faster overall operation without damage to the machine, boxes and containers being packed.

It will be further evident that the case packer of the present invention is easily converted so as to deposit any desired number of layers in a box or carton or easily converted to deposit the cans in different patterns by use of different platforms and vacuum heads and other adjustments or easily converted to different sizes of containers and boxes.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claims are also desired to be protected.

The invention claimed is:

1. A case packer comprising a frame, a platform in a first position, an object conveyer for conveying objects onto said platform, a first box conveyer operable to carry boxes to a loading position beneath said platform, a vacuum head positioned over said platform and incorporating a plurality of vacuum cups adapted to engage the individual objects for lifting thereof, means for moving said platform horizontally between a position adjacent said object conveyer and a removed position where it is no longer under said vacuum head, a funnel for guiding objects into said box, and cam means connecting said funnel and platform and arranged to force said funnel into said box when said platform moves into said removed position and to remove said funnel from said box when said platform moves into said first position.

2. The case packer of claim 1 adidtionally comprising flap control means for placing the flaps of said box in open condition as said box moves into said loading position; said flap control means comprising a second box conveyer providing a box path leading into the side of said first conveyer; a flap breaker fixed to said frame and positioned to break down the first flap on the side of the box toward the direction of movement of said first conveyer and to sufficiently overbend the flap so that it will not of its own resilience move above a horizontally extending position; said flap control means being adapted to control said first flap as well as a second flap which is toward the direction of movement of said second conveyer and sidewardly of the direction of movement of said first conveyer, as well as a third flap which is away from the direction of movement of said second conveyer and sidewardly of the direction of movement of said first conveyer, as well as a fourth flap which is away from the direction of movement of said first conveyer; a U-shaped guide member fixed to said frame above said second conveyer and said first conveyer with the base of the U-shape pointing away from said first conveyer, said U-shaped guide member having one leg of the U-shape extending horizontally over said first and second conveyers to guide said second and third flaps and the other leg of said U-shape extending horizontally over the path of said fourth flap to maintain it in a horizontal outwardly extending position relative to said box, and guide means mounted on said frame and defining a pair of inwardly opening mutually-facing recesses positioned above and on opposite sides of said first conveyer for maintaining said second and third flaps in outwardly extending positions as they move on said first conveyer.

3. The case packer of claim 1 additionally comprising flap control means for placing the flaps of said box in open conditions as said box moxes into said loading position; said flap control means comprising a second box conveyer providing a box path leading into the side of said first conveyer; a flap breaker fixed to said frame and positioned to break down the first flap on the side of the box toward the direction of movement of said first conveyer; cantilever spring means mounted on said first conveyer and arranged to move with said first conveyer to hold down said first flap as said box moves on said first conveyor; said flap control means being adapted to control said first flap as well as a second flap which is toward the direction of movement of said second conveyer and sidewardly of the direction of movement of said first conveyer, as well as a third flap which is away from the direction of movement of said second conveyer and sidewardly of the direction of movement of said first conveyer, as well as a fourth flap which is away from the direction of movement of said first conveyer; a U-shaped guide members fixed to said frame above said second conveyer and said first conveyer with the base of the U-shape pointing away from said first conveyer, said U-shaped guide member having one leg of the U-shape extending horizontally over said first and second conveyers to guide said second and third flaps and the other leg of said U-shape extending horizontally over the path of said fourth flap to maintain it in a horizontal outwardly extending position relative to said box, and guide means mounted on said frame and defining a pair of inwardly opening mutually-facing recesses positioned above and on opposite sides of said first conveyer for maintaining said second and third flaps in outwardly extending positions as they move on said first conveyor.

4. The case packer of claim 1 additionally comprising flap control means for placing the flaps of said box in open condition as said box moves into said loading position; said flap control means comprising a second box conveyer providing a box path leading into the side of said first conveyer; a flap breaker fixed to said frame and positioned to break down the first flap on the side of the box toward the direction of movement of said first conveyer and to sufficiently overbend the flap so that it will not of its own resilience move above a horizontally extending position.

5. The case packer of claim 1 additionally comprising a hold back assembly mounted on said frame and for stopping objects moving on said object conveyer while said platform is away from said first position, said hold back assembly including vertical parallel guide walls positioned over said object conveyer and extending in the direction of movement of said object conveyer for guiding said objects into parallel lines, a plurality of vertical doors hingedly mounted on respective guide walls toward the direction of movement of said object conveyer, said doors being swingable between a first door position in which they extend in alignment with said guide walls and a second door position in which they extend perpendicularly to said guide walls and across said object conveyer, said doors having a dimension between their proximal and distal ends which is long enough to prevent passage of objects between the door and the guide wall toward which it extends but short enough to permit said doors to swing to said second door position without blocking by said objects.

6. The case packer of claim 1 wherein said box conveyer comprises a flat horizontal member fixed to said frame and having an upper surface across which boxes are moved, an endless first chain with a portion thereof extending alongside and above said surface, bars fixed to and equally spaced along said chain and extending across and above said surface, first sprockets rotatably mounted on said frame and having said chain entrained thereon, a hydraulic cylinder mounted on said frame and having a piston extending through said cylinder, a further chain fixed at one end to one end of said piston and at the other end to the other end of said piston, further sprockets rotatably mounted on said frame and having said further chain entrained thereon, and a one-way clutch coupling one of said further sprockets to one of said first sprockets whereby repeated forward stroke projection and reverse stroke retraction of said hydraulic cylinder piston causes intermittent one-way movement of said bars with said movement occurring during said piston's forward stroke.

7. The case packer of claim 1 wherein said vacuum head is mounted for vertical movement on said frame, a hydraulic cylinder mounted on said frame and coupled to said vacuum head and arranged to move said vacuum cups with objects thereon down into a box, means for supplying hydraulic fluid under pressure to said hydraulic cylinder for causing said hydraulic cylinder to project and retract, said last mentioned means being arranged to have the same stroke no matter how many layers of objects have been deposited in said box, and a relief valve connected to said last mentioned means for preventing excessive hydraulic pressure when said vacuum head stalls out against layers of objects in said box.

8. The case packer of claim 1 additionally comprising a pair of mutually facing vertically extending tracks mounted on said frame, said funnel having two pairs of rollers rotatably mounted thereon with one pair of rollers positioned one above the other on one side of said funnel and the other pair of rollers positioned one above the other on the other side of said funnel, said pairs of rollers each received in a respective vertically extending track, said cam means comprising track means sloping at an angle to the horizontal and mounted on said funnel, said platform having rollers rotatably mounted thereon and riding in said track means.

9. The case packer of claim 6 additionally comprising a lever pivoted on said frame and movable between a blocking position in the path of said bars and a removed position out of the path of said bars, means associated with said further chain for moving said lever into blocking position just prior to said hydraulic cylinder reaching the end of a forward stroke of movement of said first chain, said last mentioned means also for moving said lever to removed position just prior to said hydraulic cylinder reaching the end of a reverse stroke.

10. The case packer of claim 8 additionally comprising flap control means for placing the flaps of said box in open condition as said box moves into said loading position; said flap control means comprising a second box conveyer providing a box path leading into the side of said first conveyer; a flap breaker fixed to said frame and positioned to break down a first flap on the side of the box toward the direction of movement of said first conveyer and to sufficiently overbend the flap so that it will not of its own resilience move above a horizontally extending position; said flap control means being adapted to control said first flap as well as a second flap which is toward the direction of movement of said second conveyer and sidewardly of the direction of movement of said first conveyer, as well as a third flap which is away from the direction of movement of said second conveyer and sidewardly of the direction of movement of said first conveyer, as well as a fourth flap which is away from the direction of movement of said first conveyer; a U-shaped guide member fixed to said frame above said second conveyer and said first conveyer with the base of the U-shape pointing away from said first conveyer, said U-shaped guide member having one leg of the U-shape extending horizontally over said first and second conveyers to guide said second and third flaps and the other leg of said U-shape extending horizontally over the path of said fourth flap to maintain it in a horizontal outwardly extending position relative to said box, and guide means mounted on said frame and defining a pair of inwardly opening mutually-facing recesses positioned above and on opposite sides of said first conveyer for maintaining said second and third flaps in outwardly extending positions as they move on said first conveyer.

11. The case packer of claim 8 additionally comprising flap control means for placing the flaps of said box in open condition as said box moves into said loading position; said flap control means comprising a second box conveyor providing a box path leading into the side of said first conveyer; a flap breaker fixed to said frame and positioned to break down the first flap on the side of the box toward the direction of movement of said first conveyer and to sufficiently overbend the flap so that it will not of its own resilience move above a horizontally extending position.

12. The case packer of claim 11 additionally comprising a hold back assembly mounted on said frame and for stopping objects moving on said object conveyer while said platform is away from said first position, said hold back assembly including vertical parallel guide walls positioned over said object conveyer and extending in the direction of movement of said object conveyer for guiding said object into parallel lines, a plurality of vertical doors hingedly mounted on respective guide walls toward the direction of movement of said object conveyer, said doors being swingable between a first door position in which they extend in alignment with said guide walls and a second door position in which they extend perpendicularly to said guide walls and across said object conveyer, said doors having a dimension between their proximal and distal ends which is long enough to prevent passage of objects between the door and the guide wall toward which it extends but short enough to permit said doors to swing to said second door position without blocking by said objects.

13. The case packer of claim 12 wherein said box conveyer comprises a flat horizontal member fixed to said frame and having an upper surface across which boxes are moved, an endless first chain with a portion thereof extending alongside and above said surface, bars fixed to and equally spaced along said chain and extending across and above said surface, first sprockets rotatably mounted on said frame and having said chain entrained thereon, a hydraulic cylinder mounted on said frame and having a piston extending through said cylinder, a further chain fixed at one end to one end of said piston and at the other end to the other end of said piston, further sprockets rotatably mounted on said frame and having said further chain entrained thereon, and a one-way clutch coupling one of said further sprockets to one of said first sprockets whereby repeated forward stroke projection and reverse stroke retraction of said hydraulic cylinder piston causes intermittent one-way movement of said bars with said movement occurring during said piston's forward stroke.

14. The case packer of claim 13 additionally comprising a lever pivoted on said frame and movable between a blocking position in the path of said bars and a removed position out of the path of said bars, means associated with said further chain for moving said lever into blocking position just prior to said hydraulic cylinder reaching the end of a forward stroke of movement of said first chain, said last mentioned means also for moving said lever to removed position just prior to said hydraulic cylinder reaching the end of a reverse stroke.

15. The case packer of claim 14 wherein said vacuum head is mounted for vertical movement on said frame, a hydraulic cylinder mounted on said frame and coupled to said vacuum head and arranged to move said vacuum cups with objects thereon down into a box, means for supplying hydraulic fluid under pressure to said hydraulic cylinder for causing said hydraulic cylinder to project and retract, said last mentioned means being arranged to have the same stroke no matter how many layers of objects have been deposited in said box, and a relief valve connected to said last mentioned means for preventing excessive hydraulic pressure when said vacuum head stalls out against layers of objects in said box.

References Cited
UNITED STATES PATENTS

| | | | |
|---|---|---|---|
| 2,277,688 | 3/1942 | Cattonar et al. | 53—166 X |
| 2,863,268 | 12/1958 | Holstebroe et al. | 53—62 |

WILLIAM W. DYER, JR., *Primary Examiner.*

N. ABRAMS, *Assistant Examiner.*